US007979255B2

(12) United States Patent     (10) Patent No.:   US 7,979,255 B2
Hanke et al.     (45) Date of Patent:   Jul. 12, 2011

(54) METHOD, SYSTEM AND COMPUTER PROGRAM PRODUCT FOR THE OPTIMIZATION OF POWER SYSTEM ARCHITECTURES AT THE AIRCRAFT LEVEL DURING PRE-DESIGN

(75) Inventors: Susan Hanke, Toulouse (FR); Stefan Pufe, Balma (FR)

(73) Assignee: Airbus Operations SAS, Toulouse (FR)

( * ) Notice: Subject to any disclaimer, the term of this patent is extended or adjusted under 35 U.S.C. 154(b) by 1151 days.

(21) Appl. No.: 11/687,106

(22) Filed: Mar. 16, 2007

(65) Prior Publication Data
US 2009/0070091 A1    Mar. 12, 2009

(51) Int. Cl.
*G06G 7/48*     (2006.01)
*G01M 15/00*    (2006.01)
(52) U.S. Cl. .......................................... 703/8; 73/118.3
(58) Field of Classification Search ................ 703/8, 13, 703/18; 73/118.3
See application file for complete search history.

(56) References Cited

U.S. PATENT DOCUMENTS
2002/0165696 A1* 11/2002 Bond et al. .................... 702/183

OTHER PUBLICATIONS
Reed et al. "Improving the Aircraft Design Process Using Web-based Modeling and Simulation". Jan. 2000. ACM Transactions on Modeling and Computer Simualtion, vol. 10, No. 1. Pgaes 58-83.*

Morelli. "System IDentification Programs for AirCraft (SIDPAC)". Aug. 5-8, 2002. AIAA Atmosheric Flight Mechanics Conference. AIAA-2002-4704. pp. 1-18.*
Vankan et al. "Complementary approximate modeling in Matlab and Modelica". Oct. 2004. http://citeseerx.ist.psu.edu. NLR-TR-2004-407. pp. 1-12.*
Morrmann et al. "Object-Oriented Computational Model Building of Aircraft Flight Dynamics and Systems". Dec. 17, 1998. http://www.op.dlr.de. pp. 1-13.*
Schallert et al. "Generator Power Optimsation for a More-electric Aircraft by Use of a Virtual Iron Bird".2006. ICAS 2006. 25th International Congress of the Aeronautical Sciences. pp. 1-10.*
Antoine. "Aircraft Optimization for Minimal Environmental Impact". Aug. 2004. http:// citeseerx.ist.psu.edu. The whole document.*
Jameson., AIAA Meeting Papers on Disc, Jan. 1997. "Re-engineering the design process through comutation". pp. 1-24.*

* cited by examiner

*Primary Examiner* — Paul Rodriguez
*Assistant Examiner* — Eunhee Kim
(74) *Attorney, Agent, or Firm* — Oblon, Spivak, McClelland, Maier & Neustadt, L.L.P.

(57) ABSTRACT

In an aircraft power system architecture, power requirements stem from functional top-level aircraft requirements and from the interrelationship among many systems. Thus, to balance power in the overall aircraft power system architecture or at least a portion of the power system architecture at the aircraft level, these interrelationships are considered. A method, system and computer program product are provided for the management of power system architectures at the aircraft level during pre-design. The designer can specify top-level aircraft parameters, and power values in all the systems of the aircraft at varying levels of complexity can be displayed.

22 Claims, 7 Drawing Sheets

METHOD, SYSTEM AND COMPUTER PROGRAM PRODUCT FOR THE OPTIMIZATION OF POWER SYSTEM ARCHITECTURES AT THE AIRCRAFT LEVEL DURING PRE-DESIGN

BACKGROUND OF THE INVENTION

1. Field of the Invention

The present invention relates generally to a system, method, and computer program product for managing and optimizing power systems at the aircraft level beginning at the early stages of design.

2. Description of the Related Art

The optimization of aircraft architectures with regard to power generation, consumption, distribution and transformation entails a balancing of resources in the various subsystems comprising the overall aircraft architecture. The various subsystems can thus be thought of as the local level and referred to as power systems, and the overall aircraft architecture can be thought of as the global level and referred to as the aircraft level. For example, increased mass requires increased fuel for increased thrust, but the amount of thrust required for a given aircraft is a function of mass, including the mass of fuel, and drag. Thus, balancing all the parameters or variables that affect power generation, consumption, distribution and transformation requires the ability to see the effect of changing one parameter in one power system on parameters in other power systems and also on the overall aircraft architecture.

In the past, each power system was designed independently and the balancing of resources did not occur until later in the overall design process. This type of interface between power system designs precluded dynamic modifications in each of the power systems to achieve improved balance in the overall aircraft architecture, i.e. the aircraft level, during the pre-design phase, i.e. the phase before integration of the various power systems into the aircraft level.

SUMMARY OF THE INVENTION

Therefore, an object of the present invention is to address at least the problems stated above.

The present invention includes a method, a system, and a computer program product for managing and optimizing power system architectures at the aircraft level in the pre-design phase.

The method includes receiving initialization information, determining top-level aircraft parameters based on the initialization information, calculating power requirements based on top-level aircraft parameters, iteratively pre-sizing functional parametric modules and determining system performance based on the pre-sizing, performing an optimization algorithm, and displaying simulation results.

The system includes a processor configured to receive initialization information, a determining unit configured to determine top-level aircraft parameters, a power calculating unit configured to calculate power requirements based on the top-level aircraft parameters, a simulation unit configured to iteratively perform pre-sizing and determining performance, an optimizing unit and an interface configured to display simulation results.

The computer program product includes instructions for receiving initialization information, determining top-level aircraft parameters based on the initialization information, calculating power requirements based on the top-level aircraft parameters, iteratively pre-sizing functional modules and determining system performance based on the pre-sizing, performing an optimization algorithm, and displaying simulation results.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
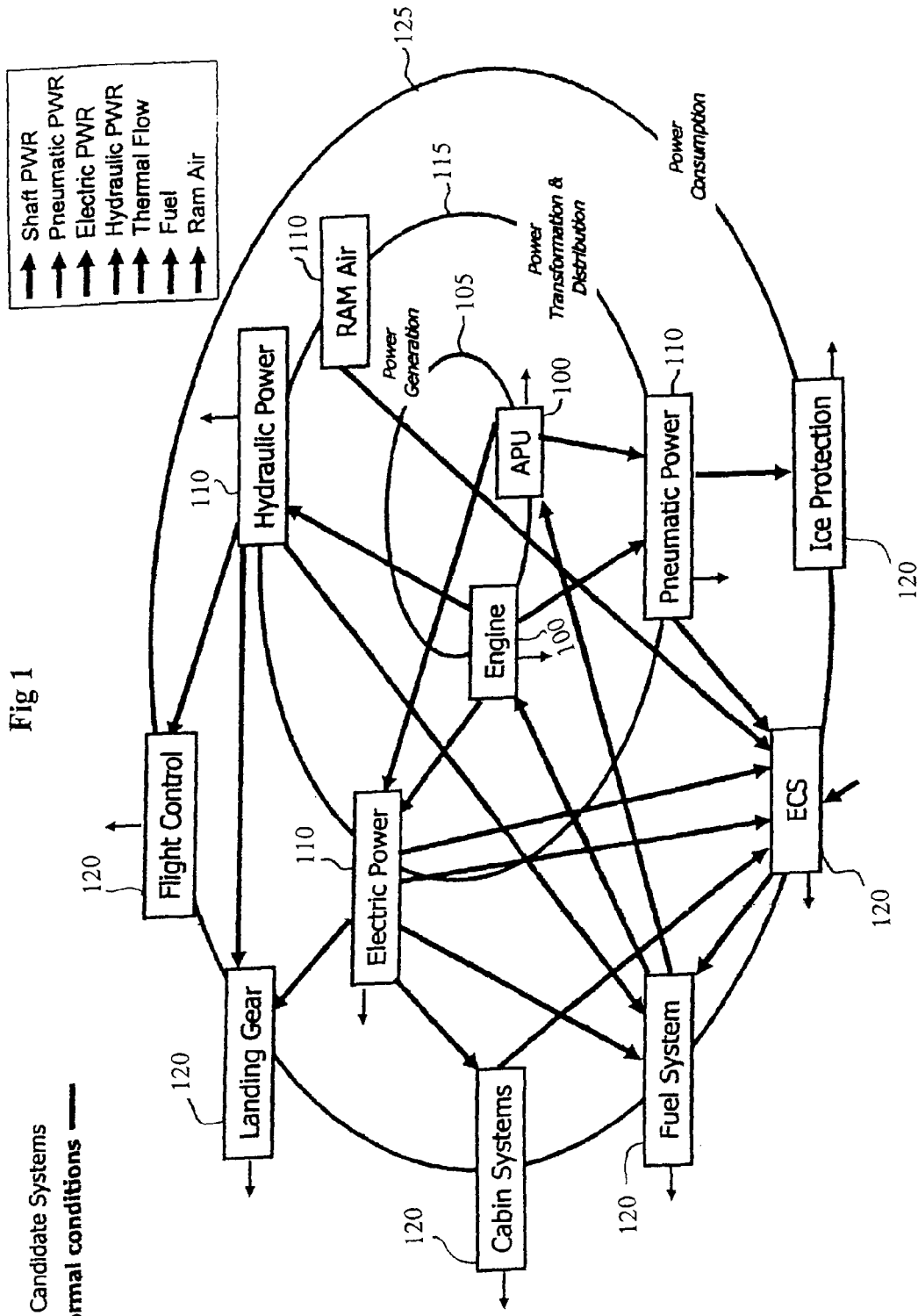
FIG. 1 illustrates the main energy flows under normal conditions.

The present invention allows the management and optimization of power systems at the aircraft level in the pre-design phase.

Referring now to the drawings, wherein like reference numerals designate identical or corresponding parts throughout the several views.

Fuel and outside air (heat sink and fresh air source) are primary energy sources for the aircraft and aircraft power systems 100, 110, and 120 (see FIG. 1). Fuel has to be carried along on the mission and, thus, contributes directly to the aircraft mass. Every ram air intake increases the aircraft drag. Solar Energy heats the cabin and, therefore, influences the need for cabin cooling, especially on the ground. Power losses are mainly rejected in the form of heat to the environment or the atmosphere surrounding the aircraft, but also to the aircraft's surrounding structure.

So-called Secondary Power—to power the aircraft systems—is extracted in the form of mechanical and pneumatic power ("bleed air") from the engine compressor. An Auxiliary Power Unit (APU) provides power on ground or in failure cases. In emergency cases, additional power generators like a Ram Air Turbine (RAT) are usually installed in big commercial airplanes.

Mechanical power is transformed into electrical and hydraulic power, which is then distributed via redundant networks throughout the aircraft in order to supply the various power consuming systems 120 (see FIG. 1). Pneumatic power is distributed, as well, via a network of bleed air ducts.

The required fuel mass for flying a specific mission depends on the aircraft thrust and, thus, on the mass and drag. For this reason, the Applicants found it advantageous to consider the coupling between fuel consumption and aircraft mass in performing a consistent comparison analysis between different selected overall aircraft architectures. The Applicants found it beneficial to account for the so-called snowball effect of fuel consumption due to additional fuel mass to be carried.

At the aircraft level, all kinds of power and energy flows could be considered: hydraulic, electric, pneumatic and mechanic energies as well as potential energy in the form of fuel and all the different thermal energies. Secondary power is supplied via the power distribution systems 110 (see FIG. 1)—taking into account safety and reliability requirements—to the power consuming systems 120 (see FIG. 1) which then fulfill various functions: e.g. guarantying maneuverability (flight controls, wing ice protection system (WIPS)), pressurizing the cabin (environmental control system (ECS)), and enabling ground operations (landing gear systems). In order to generate power with the engine, potential energy in form of fuel has to be provided. Additionally, ram air provides required airflow and is used to fulfill cooling functions. In emergency cases, power exchange can occur between the hydraulic and electric system, and the RAT supplies additional energy. If more electric or bleed-less power system architectures are regarded, new interfaces are introduced in terms of power and additional equipment, especially for cooling issues. In a nonlimiting preferred embodiment, all power and energy flows and all interfaces are considered.

The Applicants recognized the advantages of considering different levels of complexity levels with regard to energy flows at the aircraft level. A first level of complexity concerns the linear flow from the power generation systems via the distribution and transformation systems to the consumer systems. Additionally, the energy chain contains loops that increase the complexity of functional understanding within the sizing process. A second level of complexity could involve the parasitic effects of system efficiencies. Those effects either directly impact the system sizing (e.g. cabin systems heat load removal is a direct design requirement for the air conditioning system) or may require additional equipment (e.g. a dedicated cooling system) that requires power to operate. Conventional system architecture evaluation methods do not consider functional coupling of those parasitic effects although it can be advantageous if more electrical architectures are analyzed. In a nonlimiting preferred embodiment, all interdependencies are implemented.

The above-described forms and flows of energy are a function of time because not every system is operating in the same way at each phase of flight (during cruising, the engines deliver pneumatic power to the bleed system; during engine start, pneumatic or electric power has to be provided to the engine). The Applicants found that it could be advantageous to consider the time variance in energy flows at the aircraft level especially for the sizing of the power distribution systems.

The above-described forms and flows of energy are also a function of the operation mode because system requirements are different for normal and versus failure conditions. The Applicants found that it could be advantageous to consider the operational variance of energy flows at the aircraft level to avoid aggregating maximum or worst case conditions that never occur together. Different acceptable degradation states could be defined for most of the systems, which lead to lower power requirements but introduce even more complexity than only two operation states in terms of requirements for the systems providing the necessary energy.

The forms and flows of energy also depend on the system location and topology because complexity of networks (electric, hydraulic, pneumatic) directly impact the distribution of power losses. Additionally, it can be advantageous to consider the location of heat sources and sinks in order to detect synergy possibilities.

The forms and flows of energy additionally depend on safety and reliability aspects because redundant systems and power distribution circuits have to be installed. This significantly impacts the system design, and the Applicants found that it could be advantageous to challenge the requirements to the extent that the overall aircraft architecture meets the certification requirements without oversizing.

Finally, the forms and flows of energy also depend on the system configuration or technology itself because the technology influences the form of energy that is needed (e.g. electric or pneumatic). The power consumption characteristic also plays a role. For example, the Applicants found that it could be advantageous to consider whether a particular power system uses power only when it is actively operating.

FIG. 1 illustrates the interdependencies in energy flows among the various power systems under normal flight conditions. Aircraft power systems could be organized generally into three categories: power consuming systems 120, power distribution and transformation systems 110, and power generating systems 100. In addition, the categories of power systems can be considered at varying levels of complexity. For example, one level of complexity may consider the flow of energy from power generation systems through distribution and transformation systems to consumer systems. Parasitic effects of the system efficiencies have to be considered additional because they may directly or indirectly impact system sizing. For example, design of the air conditioning system must take into account the removal of heat load from cabin systems. The categories and flows of energy can be viewed as a function of: time, operational mode, system location and topology, safety and reliability requirements, or system configuration or technology. In a nonlimiting preferred embodiment, the categories and flows of energy are viewed as a function of all of the above-noted variables.

Some of the power generation systems 100 are shown as part of the power generation energy loop 105. Some power transformation and distribution systems 110 are shown as part of the power transformation and distribution energy loop 115. Some power consumption systems 120 are shown as part of the power consumption energy loop 125. As an example, the power system that encompasses cabin systems consumes electric power which originates from the engine and APU or Auxiliary Power Unit and also contributes to the power requirements of the ECS or Environmental Control System in the form of thermal flow.

Each power system can increase the energy requirements of other power systems or require more energy itself because of the effect of other power systems. Therefore, optimizing power at the global level necessitates considering energy flows at the local level.

Figure 2:
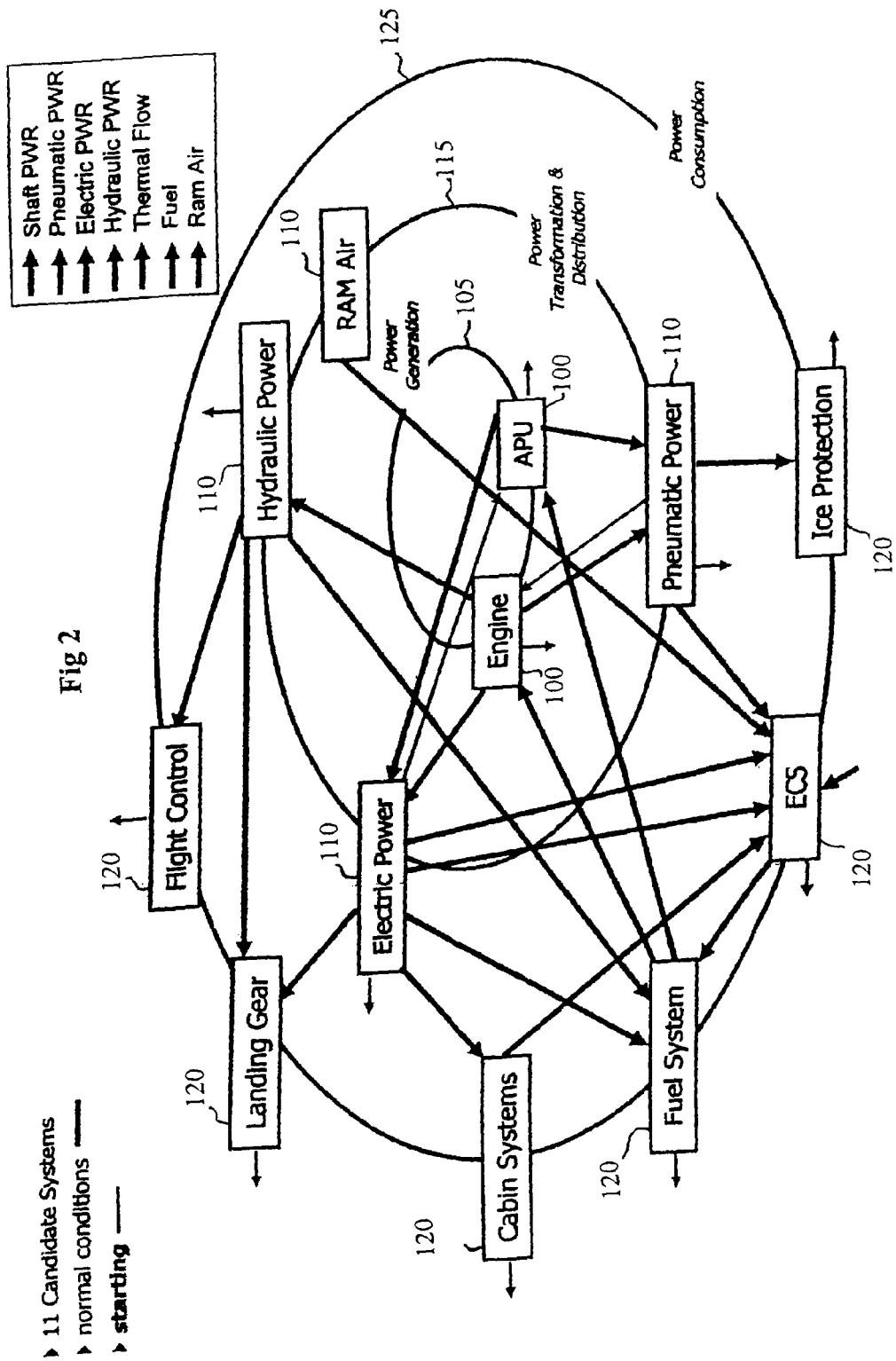
FIG. 2 illustrates the main energy flows under normal and starting conditions.

FIG. 2 additionally illustrates the interdependencies in energy flows among the various power systems under aircraft start conditions.

Figure 3:
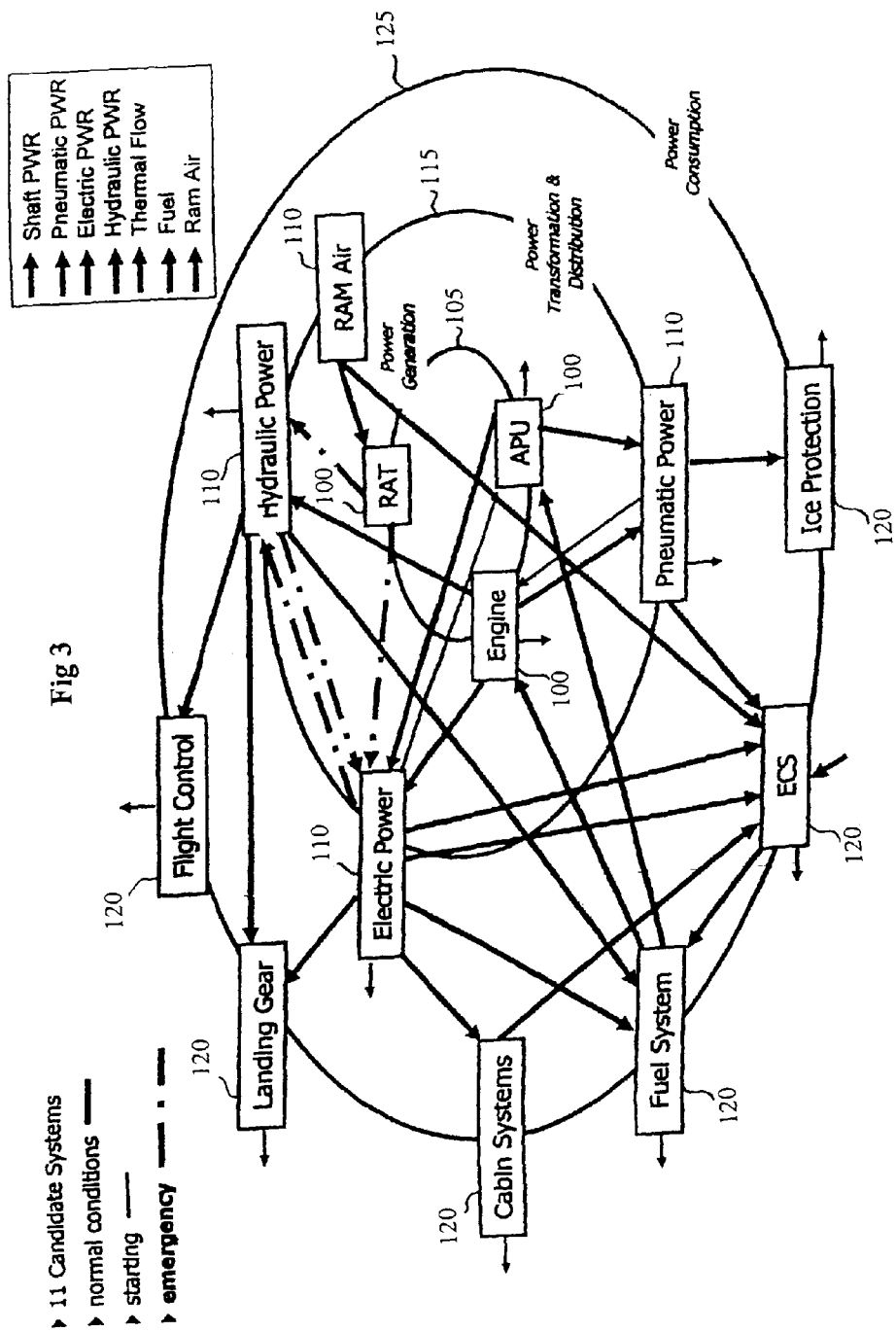
FIG. 3 illustrates the main energy flows under normal, starting and emergency conditions.

FIG. 3 additionally illustrates the interdependencies in energy flows among the various power systems under emergency conditions.

Figure 4:
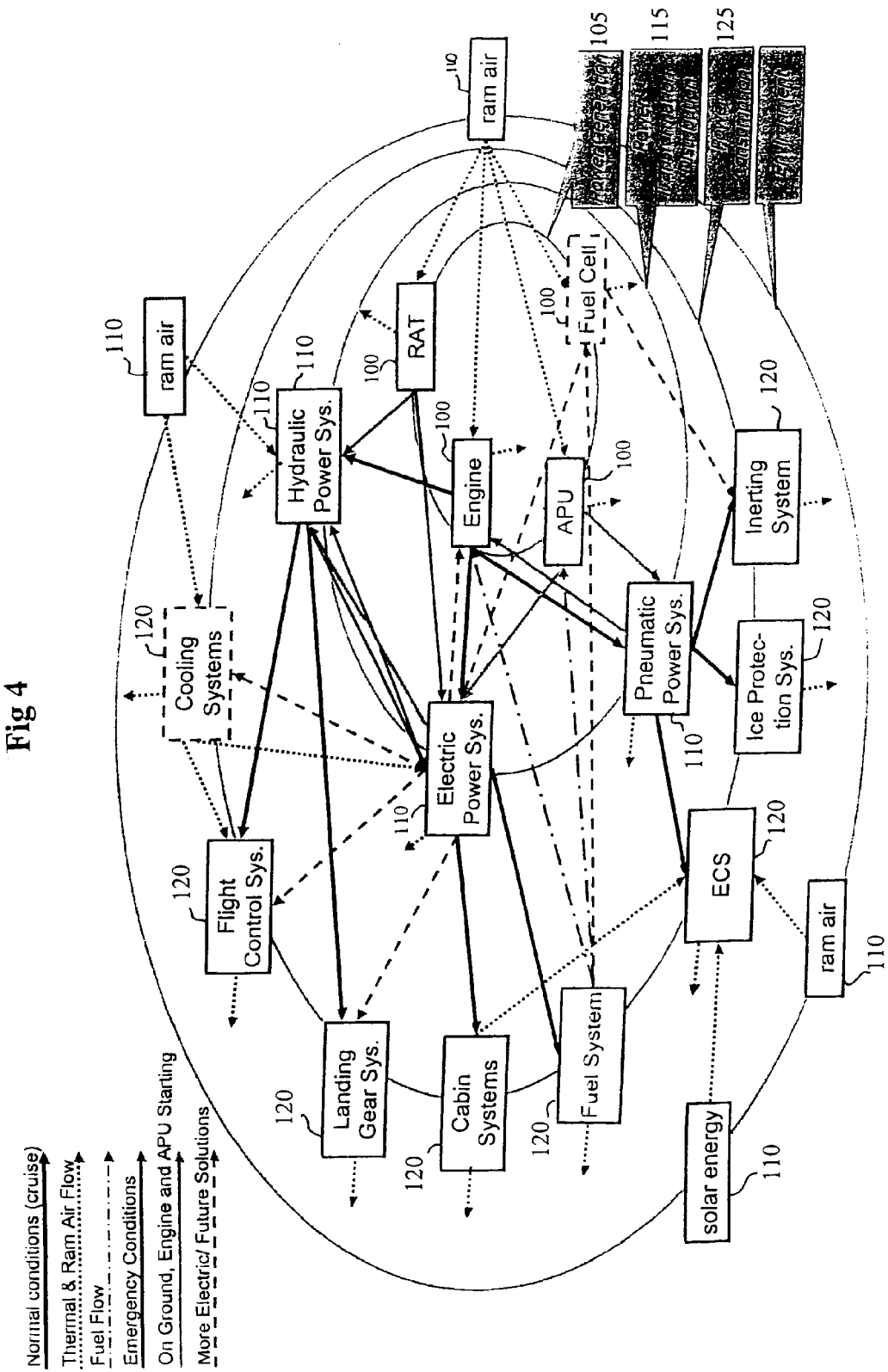
FIG. 4 illustrates the main energy flows under normal, starting, and emergency conditions with the fuel cell also depicted.

FIG. 4 additionally illustrates the interdependencies in energy flows among the various power systems by considering more electric configurations.

When designing optimized aircraft power system architectures, the Applicants found it beneficial to consider two aspects of power. First, the power to be installed could be minimized by optimizing the design at the aircraft level. Second, the power consumed with one defined system architecture during a flight mission could be optimized. The aircraft design is made to answer a broad field of requirements that may change dramatically from one airline to another. Thus, the Applicants found it beneficial to design power systems that can satisfy the maximum number of clients having the same requirements: minimum operational cost and maximum operational reliability. This means that an aircraft has to be designed e.g. for a 1000 NM mission, but is used in average only e.g. for 500 NM. The ECS design point is for maximum passenger layout, some airlines always have a 3-class layout with a lower requirement of cabin cooling—they can reduce the flow taken from the engines via a flow management function, but they always have to fly with an ECS that has the weight for supplying the worst case. Another example is cabin customization—including the cabin electrical equipment like in flight entertainment, lighting and galleys, the heat loads that have to be evacuated by the air conditioning system—that can vary significantly.

Generally, big commercial aircrafts are designed in an aircraft family concept such that power systems installed on aircrafts with different fuselage dimensions and, thus, passenger numbers have to meet the certification requirements. This could lead to oversized systems in the smaller aircraft family members.

To establish a balanced optimal aircraft power system architecture in terms of energy efficiency and broad commercial flexibility, the Applicants found it beneficial to optimize the power to be installed, to investigate the performance of the power systems for statistical missions, and to consider possible restrictions in the customization. Therefore, the Applicants recognized that it would be advantageous to develop the present invention which allows rapid coupling of these analysis processes.

The Applicants recognized the potential for optimized power system architectures with regards to: power generation (installed power and consumption), power transformation (minimize steps between generation and consumption), power distribution (topology of components to be considered), power losses (waste (heat load) may be an opportunity (heating)), and minimizing losses (in power consumption globally through more efficient technologies) and in peaks (through better power management (source sharing)).

The Applicants recognized the benefits of isolating the key parameters that influence the above-discussed aspects, and simulating the different aspects affecting energy exchange and balance as described previously in a single platform. The applicants also recognized the benefits of using parametric and generic models for each system. This integrated approach can provide transparency for all participants in the aircraft preliminary design process.

Figure 5:
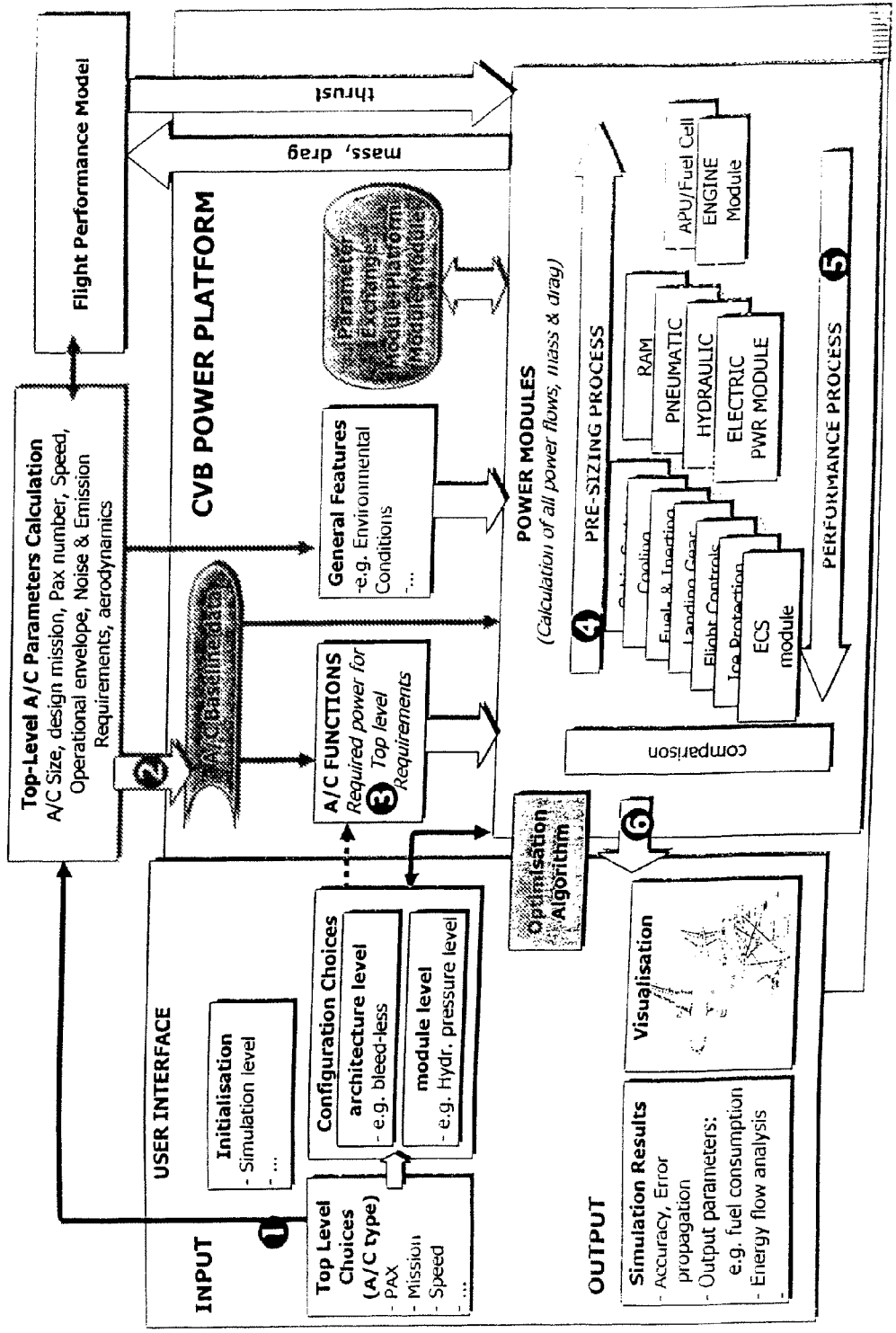
FIG. 5 illustrates the various steps of a non-limiting embodiment for the method of the present invention.

FIG. 5 illustrates the various steps of the method according to a non-limiting embodiment of the invention. At step 1, which may or may not be an initial step, initialization values are selected. These values include top-level choices such as aircraft type, mission and speed, level of simulation, and configuration choices such as architecture level and module level. At step 2, top-level parameters are determined based on the initialization values. For example, aircraft size, number of passengers, mission-specific variables, speed, noise and emission requirements and aerodynamics can be determined. In one embodiment, the AMPLI library may be accessed to extract parameters such as, for example, mission profile and thrust during cruise for a given aircraft. In addition, the AMPLI tool can serve as the link between the power system architecture and the overall aircraft performance by calculating the contribution to required thrust through the contribution to mass and drag by different power system parameters. The AMPLI tool can resize the structure and engines if the system characteristics exceed certain limits. At step 3, power requirements are calculated for the top-level parameters. At step 4, which can be referred to as the pre-sizing step, power flows, mass and drag are calculated for all of the power systems that comprise the power system architecture at the aircraft level.

Each of the power systems comprising the power system architecture at the aircraft level can be modeled in a generic and modular way and integrated with the aircraft environment and performance model, which may reside on a common platform 200 (see FIG. 7), to provide a comprehensive assessment of the impact of the design of each power system at the aircraft level. All module-to-platform and module-to-module parameter exchanges are preferably taken into consideration. That is, the modules that model each power system 100, 110, and 120 preferably take into account all of the interfaces and energy flows associated with that power system 100, 110, and 120 for each of the possible architecture configurations of that power system 100, 110, and 120.

Each module within a model of a power system 100, 110, and 120 should preferably be designed such that the power required for the function served by the module is easily discernable from the power required by a technology choice made within that module. In this way, the impact of different technology solutions on the balance of the overall architecture at the aircraft level can be assessed. The thermal load generated by each module can be directly accessible, as well. In a nonlimiting preferred embodiment, the thermal load is accessible. The functional module is based on the implementation of the logic structure of the sizing process, the process by which the contribution of the power system's design to power, mass and drag requirements is determined in a parameterized form, and is preferably implemented in a way that highlights the key sizing parameters, the fixed or already-determined parameters in the power system, and the free or as-yet unspecified design variables. By establishing interfaces, each of the power systems 100, 110, and 120 can be modeled in more detail. The module and model design are discussed in greater detail below.

Alternatively, a compatible design platform can be used for the design of each of the power systems 100, 110, and 120 such that, instead of models, up-to-date power system designs can be used at varying stages of the design process to exchange parameters, input parameter values into the common database 320 (see FIG. 7), and allow for a comprehensive assessment of the impact at the aircraft level of a design choice made at a power system level.

At step 5, performance of the aircraft design with regard to power is determined by simulating the energy flows of the pre-sized power system designs. At step 6, a selection step, for example through an optimization algorithm, can be performed to determine the combination of power system designs that provides a desired architecture, such as a balanced architecture and, preferably, the most balanced architecture, at the aircraft level. The results of the simulation and optimization can then be displayed through a user interface. Depending on a preference and/or an authorization level, for example, those of a person using the method, models with varying levels of detail can be used for the simulation or different details of the results can be made available for display. For example, a low level of detail would result in a simplified simulation.

As stated above, the Applicants found it advantageous to implement a parametric model in the present invention for each power system 100, 110, and 120 in a functional approach with regard to power demand by various power systems. Each model can contain modules that represent different system configurations, and all major interfaces can be automatically controlled with the module design. The modules can be configured based on aircraft requirements and on parameters for the design which emerges from simulation of the mission and different boundary conditions.

The Applicants identified a functional approach, rather than a division of the aircraft level based on ATA chapters, as beneficial in aircraft power management. As a first step in the approach, power systems 100, 110, and 120 can be categorized in three groups according to their function.

Power consuming systems 120 are discussed first. Important power consuming systems are the environmental control system, wing ice protection system, landing gear system, flight control system (primary flight controls and highlift system), cabin systems (galleys, in-flight entertainment, lighting), the fuel system, fuel tank inerting system and systems that are required for cooling of other systems regrouped in a "cooling module". From one point of view, the cooling systems are only "enabling systems"—they enable the functional systems to fulfill their function.

Next, power distribution and transformation systems 110 are considered. The electric, hydraulic, and pneumatic power systems distribute energy from the power generation systems 100 to the power consuming systems 120.

Third, power generation systems 100 are discussed. In current aircraft systems, the engine is the main power source. The auxiliary power unit is used for ground operations and in flight for failure conditions. The ram air turbine is an emergency power system. Fuel cell systems are possible future technology solutions. Batteries are not for "power generation" because they provide secondary power by transforming a consumable energy source. They are considered as a buffering part in the electrical distribution system.

The Applicants recognized that a beneficial consequence of a functional approach is that, starting from the aircraft functional requirements, e.g. keeping the wing surface ice free in order to guaranty maneuverability in icing conditions, the power required to fulfill the functions can be calculated. Thus, the Applicants recognized the need to formalize and parameterize the sizing process to develop a functional approach.

Next, the Applicants considered that power demand of power consuming systems 120 is mainly a function of the efficiency of the chosen system configuration. For example, if an electrically or a pneumatically powered WIPS is chosen, the power is either requested from the electric power distribution system or from the bleed air system. Taking into account the reliability requirements and efficiency within the power distribution system, the power requirement for the power generation system can be defined.

Finally, the Applicants recognized that the efficiency of the secondary power generating systems can be considered. Thus, the overall power to be installed can be calculated and the energy to be carried in terms of fuel can be defined.

The Applicants concluded that the clear distinction between the power required for a function and the amount of power required due to a certain technology choice allows comparing system architectures before committing to a certain technology.

The formalized power architecture sizing process as described above can lead to the calculation of the power to be installed. During this process, one configuration is chosen for each system leading to one overall power architecture. Once the overall architecture is pre-designed via the above-described inverse power flow process, the performance and thus operational power consumption and losses can be assessed in a direct model. For optimization and evaluation of changes, these two processes are coupled. In this way, the impact of overall aircraft top level changes, of overall power architecture choices or even of system parameters can be calculated directly and in a transparent way. In order to assess the changes in mass, drag and secondary power off take on the engine, the power systems module is preferably linked to an aircraft performance calculation that calculates the required thrust for flying the defined mission.

As discussed above, a modular approach for the implementation of the identified systems can be extremely beneficial. For each system module, the characteristics such as "power required for function", "power losses", "mass", and "contribution to aircraft drag" can be defined as standard interfaces. In a nonlimiting preferred embodiment, the characteristics are defined as standard interfaces in each system module. Additional characteristics like operational reliability, safety, and maintainability could be implemented in order to add those important non-physical parameters, which can be referred to as system parameters, to the overall analysis.

In one embodiment, each module is based on an energy balance such that the possibility for a direct assessment of parasitic thermal loads is possible. The models are parametric and, thus, generic. The key sizing parameters on the aircraft and system levels are defined—distinguishing system immanent parameters and free design variables. Thus, sensitivity analysis of the system design and the propagation of aircraft and system level changes to other modules is enabled.

Each module can contain different configurations that have been selected for comparison. Each module contains all possible interfaces in terms of energy exchange for the different configurations. Thus, the interfaces between the system modules containing different configurations stay the same. Moreover, a modular approach enables the implementation of more detailed models—by keeping the same interfaces—that will be useful to elaborate optimized system solutions within the aircraft environment by maintaining consistency between local and global optima.

Next, a model of one of the power systems is discussed to illustrate one embodiment of the modular modeling approach.

Figure 6:
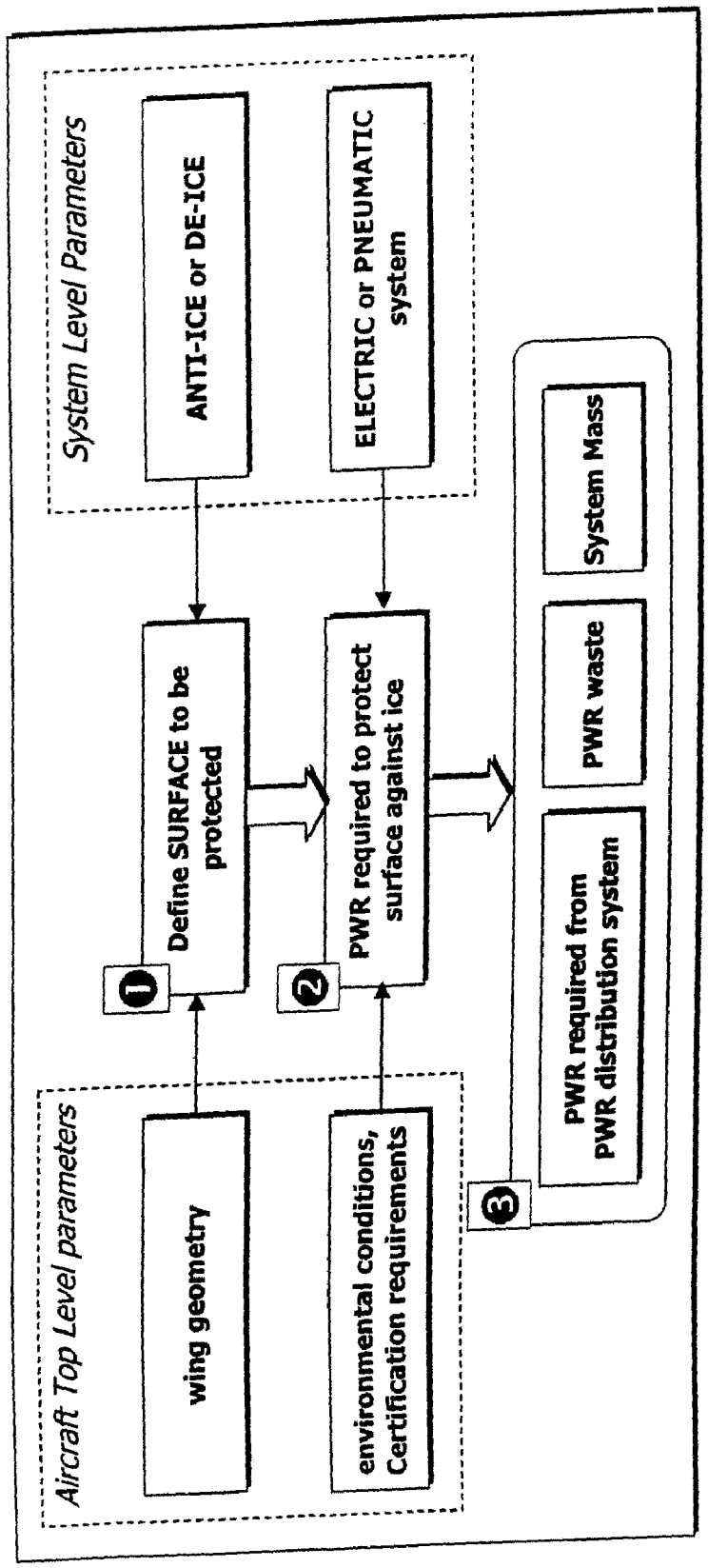
FIG. 6 depicts a block diagram of a functional module of the WIPS power system.

As an example, FIG. 6 depicts a block diagram of the Wing Ice Protection System (WIPS) power system modeled through a functional approach as discussed above. Parameters at the global level—such as, for example, wing geometry, environmental conditions and certification requirements—are used along with local level parameters—such as, for example, whether anti-ice or de-ice is required and whether an electric or pneumatic system should be used—to determine the flows of energy associated with the power system—such as, for example, power required from the power distribution systems—and dedicated parameters like e.g. the temperature and pressure of the supplied pneumatic power, power waste, and system mass which contributes to aircraft mass and ultimately affects the fuel needed for thrust. The Applicants recognized that modeling the power system in this way in the present invention allows trade-off consideration of different configurations such as, for example, a pneumatic anti-ice system or an electric de-ice system or an electric anti-ice system. In addition, combinations can be considered such as, for example, using anti-ice under normal power conditions but de-ice in a situation in which reduced power is available. As this discussion highlights, the power interfaces remain the same regardless of the power system configuration that is considered.

Next, some of the trade-off considerations that are possible with the design space created by the invention are illustrated through an example.

A questions raised in the frame of the study of more electric aircraft system configurations is the question of whether a "bleed-less" aircraft is more efficient in terms of fuel consumption (letting aside considerations like maintainability etc.). Between a conventional "bleed" architecture and a "bleed-less" architecture, various possible configurations and optimization potentials exist.

Conventional air system architectures contain a bleed system—called Pneumatic Power System (PPS) here—that provides compressed and hot air to the ECS, the WIPS, the Main Engine Start (MES) and some other smaller consumers such as the hydraulic tank pressurization. A new air consumer is the fuel tank inerting system (FTIS). For conventional designs, the engines and the APU supply bleed air to the PPS. Thus, the energy level (temperature, pressure) of the engine bleed air depends on the engine thrust level. In order to keep the temperature within the PPS distribution circuit at an acceptable level (regarding possible duct burst consequences for the surrounding structure and installed equipment) a heat exchanger (called a pre-cooler) is installed in the pylori. As the bleed air pressure is too low during idle conditions of the engine, the bleed air is taken from two different pressure ports of the engine compressor. The APU compressor design is driven by the ECS requirements for short ground operations and the MES requirements, respectively. Therefore, the APU is designed for minimum mass instead of maximum efficiency.

The main functions (influencing mainly the power demand) of the above mentioned power consumption systems and the associated power requirements are the following: the ECS and the FTIS (need airflow to fulfill their functions), the WIPS (requires energy in form of heat in order to keep the surfaces evaporated), the MES (requires mechanical power to start the engines). Therefore, each power consuming system 120 has different power requirements that are actually satisfied with the PPS system. Optimization could be obtained by assessing the functional requirements—for example, allowing a higher bleed system temperature to decrease the power loss on the pre-cooler and thus its size and weight (and also the criticality for installation), which would decrease the airflow demand of the WIPS.

For each of the systems mentioned above, a "bleed-less" solution could be imagined. That is, the power requirements would be fulfilled by a combination of ram air intake and electrical power in order to drive compressors (e.g. pressurization of ECS), producing heat (e.g. WIPS through heater mats), etc. The increasing amount of electrical power demand leads to further changes in interfacing systems such as a change to a higher voltage level in the electric power system, different electrical power equipment and higher demand for generator cooling.

In addition to choosing power consuming system configurations, choosing different power generation system configurations is possible. A hybrid solution is possible wherein the engines provide pneumatic power and mechanical power (thus electric power) but the APU delivers only electrical power. Additionally, the replacement of the APU by a fuel cell could be a solution. In addition to electric power and water, a fuel cell produces nitrogen-enriched air as a side product—the FTIS complexity can be reduced. On the aircraft level, the following changes could be considered: changes of the power off-take at the engine and power off-take at the APU, drag due to changes in ram air need, and the consumer system and distribution system weight changes (ducts are replaced by cables, different lengths of distribution due to different routing flexibility).

Thus, the design space includes different configurations of the architecture at the aircraft level, of power systems and of power system parameters. Synergies can be found regarding the functional requirements, the time axis and the design constraints. The propagation of system changes has to be evaluated at the aircraft level.

Figure 7:
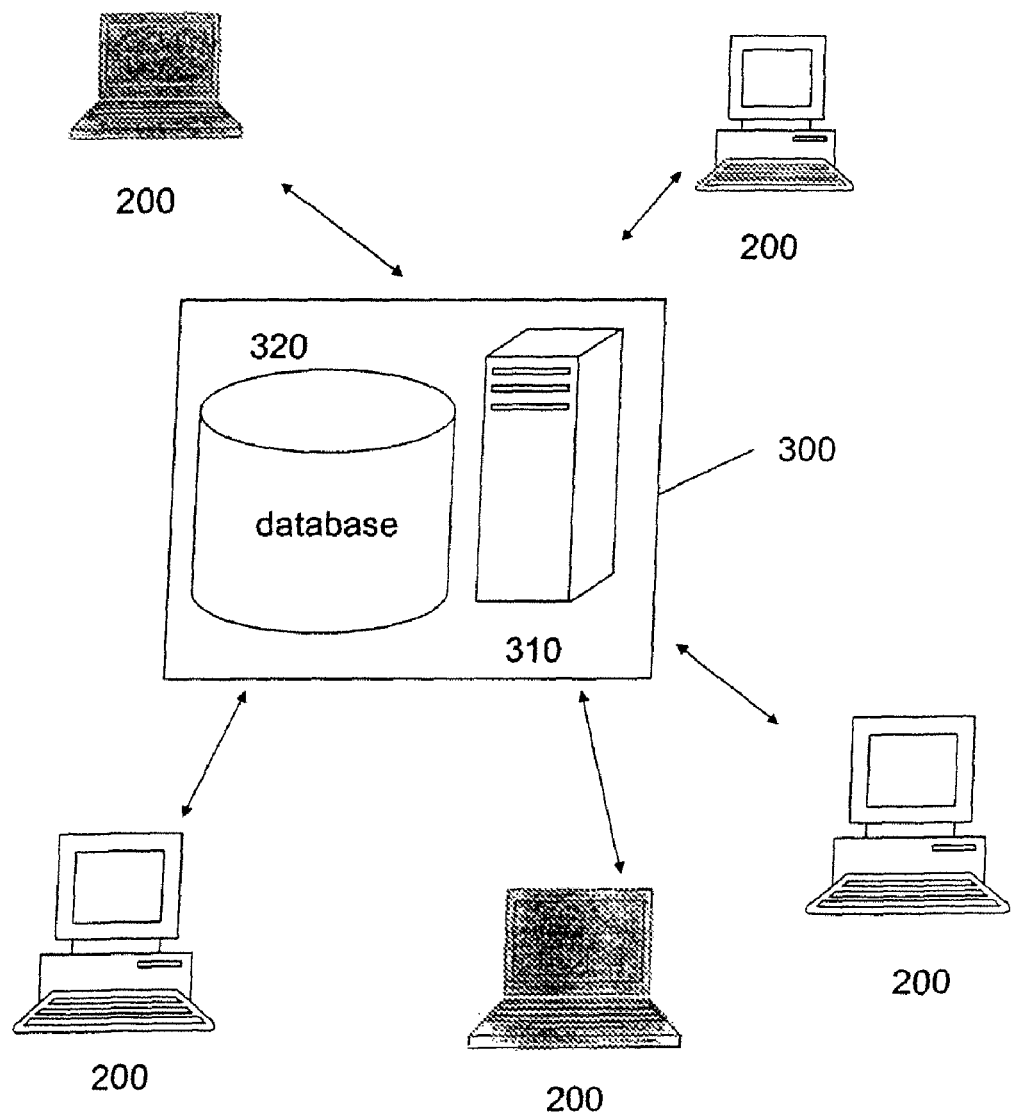
FIG. 7 illustrates the hardware and software architecture of an embodiment of the present invention.

FIG. 7 illustrates one embodiment of the invention that allows each of the power system development platforms 200 to access a common platform 300 with a database 320 and a processor 310. The common database 320 can store the parameters and models used to manage the power system architecture at the aircraft level during pre-design. The models may be written in Matlab, C, or a combination of programming languages. Each power system design platform 200 includes a processor that can, entirely or partially, manage the power system architecture at the aircraft level based on the parameters stored in the database 320. The processor 310 can also, entirely or partially, manage the power system architecture at the aircraft level based on the parameters stored in the database 320. For example, the processor 310 can include any or all of an input device, a determining unit, a power calculating unit, a simulation unit, a selecting unit, and an interface. The input device can be configured to receive initialization information. The determining unit can be configured to determine top-level aircraft parameters based on the initialization information. The power calculating unit can be configured to calculate power requirements based on the top-level aircraft parameters and other aircraft level parameter choices. In a nonlimiting preferred embodiment, the power calculating unit is configured to calculate the power requirement based on top-level aircraft parameters and on system parameters. The simulation unit can be configured to iteratively perform pre-sizing of functional modules based on the top-level aircraft parameters and power system configurations and determining of system performance at an aircraft level based on the pre-sizing. The selection unit can be configured to select a design at the aircraft level based on the system performance. The interface can be configured to display results associated with the design and the system performance.

Alternatively, each of the power system design platforms 200 or the processor 310 can store parameters and models needed to manage the power system architecture at the aircraft level.

The method presented can combine an automated pre-sizing process based on a functional approach with a performance process. This would allow a balancing between the power to be installed and the actual consumed power. The dependence of the energy flow on the time axis and the operation modes is part of the integrated approach in order to optimize the design of system architectures and of systems within the overall aircraft context. A modular approach with formalized interfaces in terms of energy exchange allows the fast analysis of different power architectures.

More consistent solutions in terms of simplified architectures and better integration of system functionalities can be developed. An integrated method is proposed that helps to stay above the complexity and see the big lines of interdependencies, improving the transparency of system functions at a global level.

One variation could involve limiting the power management discussed herein to one subset of power systems 100, 110, and 120 within a category or from different categories. Another variation could involve limiting the management to one type of power flow such as, for example, thermal load.

Obviously, numerous modifications and variations of the present invention are possible in light of the above teachings. It is therefore to be understood that within the scope of the appended claims, the invention may be practiced otherwise than as specifically described herein.

The invention claimed is:

1. A method of managing a power system architecture at an aircraft level in a pre-design phase, the method comprising:
receiving initialization information;
determining top-level aircraft parameters based on said initialization information;
calculating power requirements based on said top-level aircraft parameters;
iteratively performing, as simulations
pre-sizing of functional modules based on said power requirements and power system configurations, and
determining system performance at an aircraft level based on the pre-sizing;
selecting at least a portion of the power system architecture at the aircraft level based on said system performance; and
displaying simulation results associated with at least the portion of the power system architecture at the aircraft level and the system performance.

2. The method of claim 1, wherein the initialization information defines aircraft level parameters including aircraft type, mission type, architecture level and module level of interest.

3. The method of claim 1, wherein the top-level aircraft parameters determined based on said initialization information include aircraft size, passenger number, noise and emission requirements, aerodynamics, and operational envelope.

4. The method of claim 1, wherein the functional modules used in the pre-sizing process are models.

5. The method of claim 4, wherein the models are in Matlab.

6. The method of claim 1, wherein the simulation results include accuracy, error propagation, and output parameters including fuel consumption and energy flow analysis.

7. The method of claim 1, wherein displaying simulation results is accomplished through a graphical user interface.

8. A system for managing power system architectures at an aircraft level in a pre-design phase, the system comprising:
an input device configured to receive initialization information;
a determining unit configured to determine top-level aircraft parameters based on said initialization information;
a power calculating unit configured to calculate power requirements based on said top-level aircraft parameters;
a simulation unit configured to iteratively perform
pre-sizing of functional modules based on said power requirements and power system configurations, and
determining of system performance at an aircraft level and on a module level based on the pre-sizing;
a selecting unit configured to select at least a portion of the power system architecture at the aircraft level based on said system performance; and
an interface configured to display results associated with at least the portion of the power system architecture at the aircraft level and the system performance.

9. The system of claim 8, wherein the input device is configured to receive the initialization information through a graphical user interface.

10. The system of claim 9, wherein the graphical user interface is developed in Matlab.

11. The system of claim 8, wherein the initialization information received by the input device includes aircraft type, mission type, speed, architecture level and module level of interest.

12. The system of claim 11, wherein the module level of interest affects the simulation results calculated and displayed by the interface including accuracy and error propagation.

13. The system of claim 8, wherein the simulation unit exchanges parameters with a power platform that includes parameters including environmental conditions.

14. The system of claim 8, wherein the simulation unit considers non-physical trade-off criteria including reliability in determining system performance.

15. The system of claim 8, wherein the interface can be configured to limit the simulation results displayed based on factors including a level of detail desired and a level of detail permitted.

16. A non-transitory computer readable storage medium for managing power system architectures at an aircraft level during a pre-design phase, said non-transitory computer readable storage medium configured to store instructions for execution on a computer enabling the computer to perform steps of:
receiving initialization information;
determining top-level aircraft parameters based on said initialization information;
calculating power requirements based on said top-level aircraft parameters;
iteratively performing, as simulations
pre-sizing of functional modules based on said power requirements and power system configurations, and
determining system performance at an aircraft level based on the pre-sizing;
selecting at least a portion of the power system architecture at the aircraft level based on said system performance; and
displaying simulation results associated with at least the portion of the power system architecture at the aircraft level and the system performance.

17. The non-transitory computer readable storage medium of claim 16, wherein the stored instructions are written in Matlab.

18. The non-transitory computer readable storage medium of claim 16, wherein the stored instructions are written in a combination of programming languages.

19. The non-transitory computer readable storage medium of claim 16, wherein the program may be executed locally by a single processor or remotely by multiple processors over a network connection.

20. The non-transitory computer readable storage medium of claim 16, wherein the functional modules are modeled in Matlab.

21. The non-transitory computer readable storage medium of claim 16, wherein the functional modules are linked to power system design platforms such that design parameters are updated with parameters from the most recent power system designs.

22. The non-transitory computer readable storage medium of claim 16, wherein displaying simulation results are controlled to limit the simulation results displayed based on a desired level of complexity or access.

* * * * *